United States Patent
Hansen et al.

(10) Patent No.: US 11,505,503 B2
(45) Date of Patent: Nov. 22, 2022

(54) CERAMIC HONEYCOMB BODIES AND MANUFACTURE

(71) Applicant: CORNING INCORPORATED, Corning, NY (US)

(72) Inventors: Marcia Kim Hansen, Fairport, NY (US); Michael James Lehman, Canisteo, NY (US); Elizabeth Marie Vileno, Corning, NY (US)

(73) Assignee: Corning Incorporated, Corning, NY (US)

( * ) Notice: Subject to any disclaimer, the term of this patent is extended or adjusted under 35 U.S.C. 154(b) by 146 days.

(21) Appl. No.: 16/849,407

(22) Filed: Apr. 15, 2020

(65) Prior Publication Data

US 2020/0331813 A1    Oct. 22, 2020

Related U.S. Application Data

(60) Provisional application No. 62/835,667, filed on Apr. 18, 2019.

(51) Int. Cl.
| | |
|---|---|
| C04B 35/636 | (2006.01) |
| C04B 35/64 | (2006.01) |
| C04B 35/632 | (2006.01) |
| C04B 35/622 | (2006.01) |
| C04B 35/195 | (2006.01) |
| B28B 3/20 | (2006.01) |
| B01J 35/04 | (2006.01) |
| C04B 38/00 | (2006.01) |

(Continued)

(52) U.S. Cl.
CPC ........... *C04B 38/0006* (2013.01); *B01J 35/04* (2013.01); *B28B 3/20* (2013.01); *B28B 3/269* (2013.01); *C04B 35/195* (2013.01); *C04B 38/0041* (2013.01); *B01D 53/94* (2013.01); *B28B 2003/203* (2013.01); *C04B 35/622* (2013.01); *C04B 35/632* (2013.01); *C04B 35/636* (2013.01); *C04B 35/6365* (2013.01); *C04B 35/64* (2013.01); *C04B 2235/3481* (2013.01)

(58) Field of Classification Search
None
See application file for complete search history.

(56) References Cited

U.S. PATENT DOCUMENTS

| | | | | |
|---|---|---|---|---|
| 5,114,644 A | * | 5/1992 | Beall | ........................ B01J 21/14 264/631 |
| 6,506,336 B1 | | 1/2003 | Beall et al. | |

(Continued)

FOREIGN PATENT DOCUMENTS

JP    5767319    8/2015

OTHER PUBLICATIONS

Nobbmann, Ulf. "D10, D50, D90—for DLS? Yes Not Just Diffraction—with Caution." Materials Talks, Aug. 25, 2016, www.materials-talks.com/d90-d50-d10-and-span-for-dls. (Year: 2016).*

(Continued)

*Primary Examiner* — Kelly M Gambetta
*Assistant Examiner* — Andrés E. Behrens, Jr.
(74) *Attorney, Agent, or Firm* — Joseph M. Homa

(57) ABSTRACT

Batch mixtures comprising alumina trihydrate for forming ceramic honeycomb bodies comprised of cordierite and methods of manufacturing honeycomb bodies from such batch mixtures are provided.

11 Claims, 4 Drawing Sheets

(51) Int. Cl.
*B28B 3/26* (2006.01)
*B01D 53/94* (2006.01)

(56) References Cited

U.S. PATENT DOCUMENTS

| | | | |
|---|---|---|---|
| 6,562,284 | B2 | 5/2003 | Beall et al. |
| 7,485,170 | B2 | 2/2009 | Beall et al. |
| 7,541,303 | B2 | 6/2009 | Addiego et al. |
| 7,575,618 | B2 | 8/2009 | Miao et al. |
| 7,648,548 | B2 | 1/2010 | Miao et al. |
| 7,704,926 | B2 | 4/2010 | Zhou et al. |
| 7,744,670 | B2 | 6/2010 | Miao et al. |
| 8,389,101 | B2 | 3/2013 | Merkel |
| 8,501,296 | B2 | 8/2013 | Merkel |
| 8,591,623 | B2 | 11/2013 | Beall et al. |
| 9,878,958 | B2 | 1/2018 | Bronfenbrenner et al. |
| 11,260,558 | B2 * | 3/2022 | Fujie ............... B28B 11/007 |
| 2009/0011919 | A1 * | 1/2009 | Noguchi ............ C04B 38/0006 501/80 |
| 2009/0295007 | A1 * | 12/2009 | Addiego ............ C04B 38/0695 264/43 |
| 2011/0293882 | A1 | 12/2011 | Kerr et al. |
| 2016/0289123 | A1 | 10/2016 | McCauley et al. |
| 2018/0127316 | A1 | 5/2018 | Sarma et al. |
| 2018/0148382 | A1 | 5/2018 | Wing |
| 2021/0268688 | A1 * | 9/2021 | Sendo ............... B01D 39/2079 |

OTHER PUBLICATIONS

Hwang, Shiang-Po, and Jenn-Ming Wu. "Effect of Composition on Microstructural Development in MgO—Al2O3—SiO2Glass-Ceramics." Journal of the American Ceramic Society, vol. 84, No. 5, 2001, pp. 1108-1112. Crossref, https://doi.org/10.1111/j.1151-2916.2001.t00797.x. (Year: 2001).*

Yaman, C., and M. Marsoglu. "Effect of Silica on Thermal Shock Resistance of Cordierite/ Der Einflß von Siliciumoxid Auf Die Thermoschockbeständigkeit von Cordierit." Practical Metallography, vol. 32, No. 11, 1995, pp. 571-578. Crossref, https://doi.org/10.1515/pm-1995-321105. (Year: 1996).*

Sembiring, Simon, et al. "Effect of Alumina Addition on the Phase Transformation and Crystallisation Properties of Refractory Cordierite Prepared from Amorphous Rice Husk Silica." Journal of Asian Ceramic Societies, vol. 5, No. 2, 2017, Crossref, https://doi.org/10.1016/j.jascer.2017.04.005 (Year: 2017).*

* cited by examiner

CERAMIC HONEYCOMB BODIES AND MANUFACTURE

This application claims the benefit of priority under 35 U.S.C. § 119 of U.S. Provisional Application No. 62/835,667 filed on Apr. 18, 2019, the content of which is incorporated herein by reference in its entirety.

BACKGROUND his disclosure generally relates to ceramic-forming mixtures that can be used in the formation of ceramic honeycomb bodies and methods of making and using honeycomb bodies from such ceramic mixtures. More particularly, the disclosure provides mixtures that exhibit reduced abrasiveness and consequently lower wear on forming dies used to form ceramic honeycomb bodies.

Ceramic honeycomb substrates containing a catalyst such as an oxidation catalyst and a three-way catalyst are used in close-coupled applications in gasoline engine emission control to enable the substrate to heat up faster. This in turn enables the catalyst to become active sooner, resulting in reduced cold-start emissions. This problem has been addressed by automobile manufacturers by controlling engine operation during start-up, thus optimizing engine temperatures and fuel usage, which is both complicated and negatively impacts fuel economy of the vehicle. Mobile emissions catalytic converter manufacturers have addressed this issue by adding increased amounts of platinum group metals (PGM) to the washcoats that are used to coat the ceramic honeycomb substrates which is inefficient and very expensive.

Ceramic honeycomb substrate manufacturers have provided honeycomb substrates with very low heat capacity to enable fast light off. Batch mixtures of ceramic materials that are extruded through the die to form a honeycomb substrate for these applications can cause a high degree of wear on the dies that are used to extrude the honeycomb bodies. Abrasion of the die may cause frequent recoating of the dies and/or a low die life due to extensive wear. In addition, other elements in the extruder that are contacted with the batch mixture frequently have to be replaced due to abrasive wear. There is a need to provide improved batch mixtures of ceramic materials that are easier to process.

SUMMARY

A first aspect of this disclosure pertains to a mixture of cordierite-forming starting materials. The mixture comprises a plurality of inorganic components comprising alumina trihydrate ($Al(OH)_3$) in an amount of from 5 wt % to about 35 wt % with respect to the inorganic components, and particulate silica having a D90 particle size less than 15 μm and greater than 0.5 μm in an amount of from 5 wt % to about 30 wt % with respect to the inorganic components, wherein the mixture is free of clay.

A second aspect of the disclosure pertains to method of manufacturing a ceramic honeycomb article. The method comprises extruding a mixture through a die to form a green honeycomb article, the mixture comprising a liquid, a binder and a plurality of inorganic components comprising alumina trihydrate ($Al(OH)_3$) in an amount of from 5 wt % to about 35 wt % with respect to the inorganic components (Al$(OH)_3$), and particulate silica having a D90 particle size less than 15 μm and greater than 0.5 μm. in an amount of from 5 wt % to about 30 wt % with respect to the inorganic components, wherein the mixture is free of clay; and heating the green honeycomb article to expose the green honeycomb article to temperatures for times sufficient to form a honeycomb article having a cordierite phase Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

It will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

DETAILED DESCRIPTION

Before describing several exemplary embodiments, it is to be understood that the disclosure is not limited to the details of construction or process steps set forth in the following disclosure. The disclosure provided herein is capable of other embodiments and of being practiced or being carried out in various ways.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Figure 1:
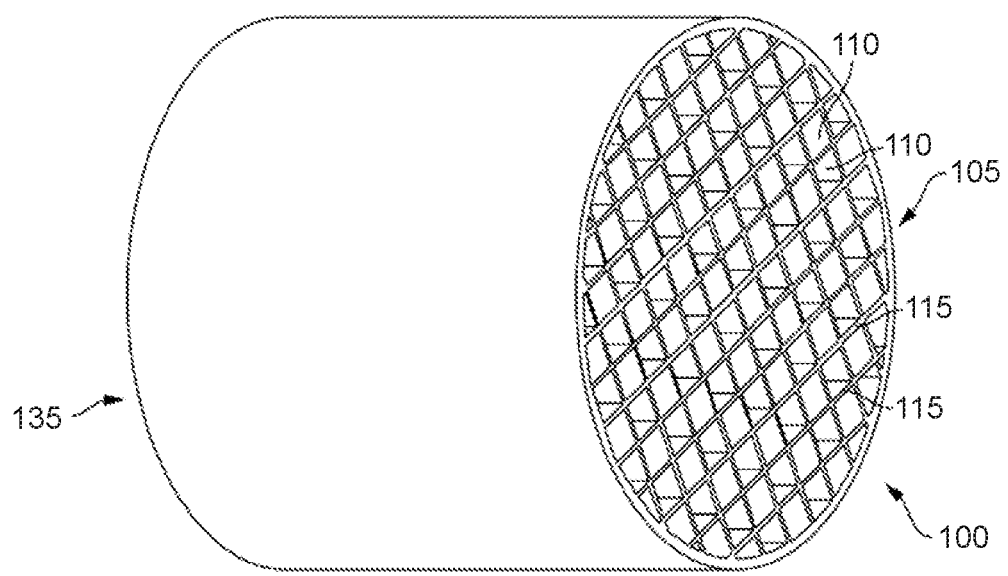
FIG. 1 is a perspective view of a honeycomb body according to one or more embodiments.

With reference now to FIG. 1, an exemplary embodiment of a honeycomb body 100 comprises a plurality of cell walls 115 defining a plurality of inner channels 110. The plurality of inner channels 110 and intersecting cell walls 115 extend between a first end 105 and a second end 135 of the honeycomb body. The first end 105 may also be referred to an inlet face, and the second end 135 may be referred to an outlet face. When the honeycomb body is in use, the first end 105 or inlet face is closest to the engine exhaust, the exhaust gas enters the first end 105 or inlet face of the substrate and exits the honeycomb body 100 through the second end 135 or outlet face.

Embodiments of the disclosure pertain to batch mixtures that are less abrasive, easier to process (in drying and firing), and lower in cost than existing batch mixtures that are used to form honeycomb bodies of the type shown in FIG. 1. Specific embodiments pertain to mixtures of cordierite-forming starting materials. By substituting some of the calcined alumina and boehmite (AlOOH or mono hydrate alumina) with alumina trihydrate ($Al(OH)_3$), one or more of these objectives can be accomplished. It was discovered that in addition to providing a less abrasive batch mixture, incorporation of alumina trihydrate, due the lower density, allows for less pore former to be added to the batch mixtures.

According to a first embodiment of the disclosure, a mixture of cordierite-forming starting materials is provided. The mixture comprises a plurality of inorganic components comprising alumina trihydrate ($Al(OH)_3$) in an amount of from about 5 wt % to about 35 wt % with respect to the inorganic components, and particulate silica having a D90 particle size less than 15 μm and greater than 0.5 μm. in an amount of from about 5 wt % to about 30 wt % with respect to the inorganic components, wherein the mixture is free of clay. The particle size according to one or more embodiments is measured using a laser light scattering, for example, a Microtrac S3000 or a Microtrac S3500 made by Microtrac Inc., Montgomeryville, Pa., USA and following the procedure set forth in ASTM B822-17 "Standard Test Method for Particle Size Distribution of Metal Powders and Related Compounds by Light Scattering."

In different embodiments, the amount of the alumina trihydrate ($Al(OH)_3$) can also be in a range of from about 5 wt % to about 20 wt % of from about 8 wt % to about 18 wt % with respect to the inorganic components. In one or more embodiments, the particulate silica is present in an amount of from about 10 wt % to about 30 wt % or from about 12 wt % to about 25 wt %.

In some embodiments, the particulate silica has a median particle size in a range of from about 0.001 μm to about 10 μm. In some embodiments, the mixture further comprises one or more pore formers in an amount of the first pore former material present in an amount of from 0% by weight and 15% by weight as a superaddition to a dry weight of the plurality of inorganic components, and a second pore former in the amount of 0% to 20%. In some embodiments, the pore former material comprises one or more of starches, starch-based materials, cellulose-based compounds, graphite, activated carbon, coke, synthetic polymers, and naturally occurring polymers. In specific embodiments, the pore former material of the mixture consists essentially of graphite. In other specific embodiments, the amount of pore former in the mixture comprises 0% by weight.

According to one or more embodiments, suitable pore former materials include any particulate substance that burns out of the green body during firing to create pores in the fired ceramic. Examples of pore former materials include, but are not limited to, carbon pore formers, such as graphite, activated carbon, petroleum coke, and carbon black; starch pore formers, such as corn, barley, bean, potato rice, tapioca, pea, sago palm, wheat, canna, and walnut shell flours; polymer pore formers, such as polybutylene, polymethylpentene, polyethylene, polypropylene, polystyrene, polyamides (nylons), epoxies, ABS, acrylics, and polyesters (PET); and combinations thereof. According to at least one embodiment, the at least one pore former is chosen from carbon pore formers such as graphite and starch pore formers such as rice corn, corn, and potato.

The mixture of cordierite-forming starting materials may be mixed to obtain a substantially homogenous mixture of cordierite-forming starting materials using any method known in the art. For example, the at least one inorganic ceramic-forming material may be a powder which is wetted with at least one component chosen from solvents, binders, and combinations thereof. The solvent and/or binder may be added in any amount that is suitable to wet and/or plasticize the batch. The mixing and/or plasticization of the batch may take place in any suitable mixer in which the batch will be plasticized. For example, a ribbon mixer, twin-screw extruder/mixer, auger mixer, muller mixer, or double arm mixer may be used.

The mixture of cordierite-forming starting materials may, in various embodiments, be shaped into a green honeycomb by any process known to those skilled in the art for shaping plasticized mixtures. By way of example, the mixture of cordierite-forming starting materials may be subjected to injection-molding, extrusion, slip casting, centrifugal casting, pressure casting, or dry pressing.

The mixture of cordierite-forming starting materials may be extruded either vertically or horizontally and the extruder may optionally employ a die. The extrusion may, in some embodiments, be performed using a hydraulic ram extrusion press, a two-stage de-airing single auger extruder, or a twin-screw mixer with a die assembly attached to the discharge end. The proper screw elements may be chosen according to the mixture of cordierite-forming starting materials and other process conditions so as to build up sufficient pressure to force the batch mixture through the die.

By extruding the mixture of cordierite-forming starting materials, a green honeycomb having a plurality of cells separated from each other by partitions or walls can be obtained. In various embodiments, a particular die may be chosen such that the green honeycomb has a desired cell shape, wall thickness, and/or cell density.

The green honeycomb may optionally be dried by any conventional method known to those skilled in the art to form a green honeycomb. For instance, the green honeycomb may be dried using hot-air drying, dielectric drying, microwave drying, drying under reduced pressure, vacuum drying, or freeze drying.

In various exemplary embodiments, the green honeycomb may then be fired to form a ceramic honeycomb. It is within the ability of one skilled in the art to determine the appropriate method and conditions for forming a ceramic honeycomb, such as, for example, firing conditions including equipment, temperature and duration. Such methods and conditions may depend, for example, upon the size and materials mixture of the green honeycomb, as well as the desired properties of the ceramic honeycomb.

The green honeycomb may be fired at a selected temperature under a suitable atmosphere for a time dependent upon the mixture, size, and geometry of the green honeycomb. For example, the temperature at which firing occurs may range from about 1300° C. to about 1450° C., and the firing time may range from about 1 to about 200 hours, for instance, from about 3 to about 100 hours, or from about 20 to about 50 hours.

Optionally, the green honeycomb may be calcined to burn out the optional pore former, binder, and/or surfactant, either before firing or in a temperature-rise process during firing. For instance, the binder may have a combustion temperature of about 200° C., and the pore former may have a combustion temperature ranging from about 300° C. to about 1000° C. Accordingly, the temperature at which calcination occurs may range from about 200° C. to about 1000° C., and the calcination time may range from about 10 to about 100 hours.

The dimensions of the green honeycomb and/or the fired honeycomb may be measured using any conventional method known in the art. For instance, in some embodiments, the diameter of the honeycomb may be measured. In other embodiments, the radius, height, and/or overall volume of the honeycomb may be measured.

The shrinkage and/or growth of the honeycomb from green state to fired state may, for example, be determined using the following equation:

Shrinkage %=([green size]−[fired size])/(green size)

where "size" is one of the above-mentioned measured dimensions, such as honeycomb diameter or height.

Another aspect of the disclosure pertains to a method of manufacturing a ceramic honeycomb article. In one embodiment, the method comprises extruding a mixture through a die to form a green honeycomb article, the mixture comprising a liquid, a binder and a plurality of inorganic components comprising alumina trihydrate ($Al(OH)_3$) in an amount of from 5 wt % to about 35 wt % with respect to the inorganic components ($Al(OH)_3$), and silica a D90 particle size less than 15 μm and greater than 0.5 μm. in an amount of from 5 wt % to about 30 wt % with respect to the inorganic components, wherein the mixture is free of clay. The method further comprises heating the green honeycomb article to expose the green honeycomb article to temperatures for times sufficient to form a honeycomb article having a cordierite phase.

In some embodiments of the method, surfaces of the die in contact with the mixture are worn down by the extruding at a slower rate than for surfaces of a die in contact with a nearly identical mixture except that the nearly identical mixture does not contain alumina trihydrate but contains a different alumina source in place of alumina trihydrate. In some embodiments, surfaces of the die in contact with the mixture are worn down by the extruding at a slower rate than for surfaces of a die in contact with a nearly identical mixture except that the nearly identical mixture contains silica having a D90 particle size greater than 15 μm.

In different embodiments of the method, the amount of the alumina trihydrate ($Al(OH)_3$) can also be in a range of from about 5 wt % to about 20 wt % of from about 8 wt % to about 18 wt % with respect to the inorganic components. In one or more embodiments, the particulate silica is present in an amount of from about 10 wt % to about 30 wt % or from about 12 wt % to about 25 wt %.

In some embodiments of the method, the particulate silica has a median particle size in a range of from about 0.001 μm to about 10 μm. In some embodiments, the mixture further comprises an amount of pore former material present in an amount of from 0% by weight and 15% by weight as a superaddition to a dry weight of the plurality of inorganic components. In some embodiments of the method, the pore former material comprises one or more of starches, starch-based materials, cellulose-based compounds, graphite, activated carbon, coke, synthetic polymers, and naturally occurring polymers. In specific method embodiments, the pore former material of the mixture consists essentially of graphite. In other specific method embodiments, the amount of pore former in the mixture comprises 0% by weight.

It was discovered that substituting the calcined alumina ($Al_2O_3$) and boehmite (AlOOH or mono hydrate alumina) with aluminum trihydrate ($Al(OH)_3$) resulted in a mixture of materials that was less abrasive than mixtures containing calcined alumina or boehmite. In some embodiments, the mixture of cordierite-forming starting materials provides a mixture with lower density, and therefore, higher native porosity is achieved, allowing for less pore former material to be used to achieve the same porosity as a mixture that does not use a substitution of alumina trihydrate. Graphite is a very commonly used pore former material in the manufacture of cordierite honeycomb bodies. When the mixture of cordierite-forming starting materials contains graphite, the extruded green body is more difficult to dry. Accordingly, by reducing the amount of graphite pore former material or eliminating the graphite completely allows for more uniform and more efficient drying a green honeycomb body. Furthermore, graphite requires a relatively long period of time to burn out during firing. Therefore, a green honeycomb body extruded from a mixture of cordierite-forming starting materials with reduced graphite or no graphite requires reduced firing time compared to a green body containing a greater amount of graphite. Furthermore, reduction or elimination of graphite from the mixture of cordierite-forming starting materials reduces the cost of producing cordierite honeycomb bodies.

It was also discovered that substituting the coarse silica with a fine silica as defined by the claims also reduced the abrasiveness of the mixture of cordierite-forming starting materials. In addition to the above advantages, and compared to other solutions, changing the mixture of cordierite-forming starting materials that reduces wear of the die is less difficult than providing new die and extrusion equipment materials and coatings. In addition, the mixtures of cordierite-forming starting materials described herein do not require an increase in pressure to extrude the mixture of cordierite-forming starting materials into a green honeycomb body.

In specific embodiments, the mixture is dry blended, mixed with liquids to form a paste, and extruded through a die to form a honeycomb body. The final honeycomb body typically has thin webs, so the coated die slots are usually <4 mil and sometimes <3 mil wide. In some embodiments, tolerance on the web thickness is no more than +/−0.3 mil, and the coatings on the die do not last very long. Dies are machined from steel and then coated with a harder material, typically by vapor deposition or electrolysis. The coating can be another metal (like Ni), or it can be a hard material like TiC. However, abrasive mixtures will cause the die coating to prematurely wear. Using the mixtures according to one or more embodiments of the present disclosure, the time between die coatings can be increased. After the honeycomb body is extruded, it is transferred to a tray and dried in a dryer, which in some embodiments is microwave powered. After drying the honeycomb body to at least 75% dry, or greater than 85% dry, the honeycomb body is then cut to length and fired at about 1415° C. (1400° to 1430° C.) for at least 4 hours, and not more than 20 hours. In specific embodiments, the final honeycomb body has webs that are typically 2.5 to 4.5 mils thick and a porosity of 55%, as measured by mercury porosimetry.

EXAMPLES

Several green honeycomb bodies were prepared using batch materials comprising boehmite, calcined alumina, and alumina trihydrate. Several inventive batches also contained fine particulate silica (particulate silica having a D90 particle size less than 15 μm and greater than 0.5 μm) instead of coarse particulate silica (particulate silica having a D90 particle size greater than 15 μm).

Figure 2A:
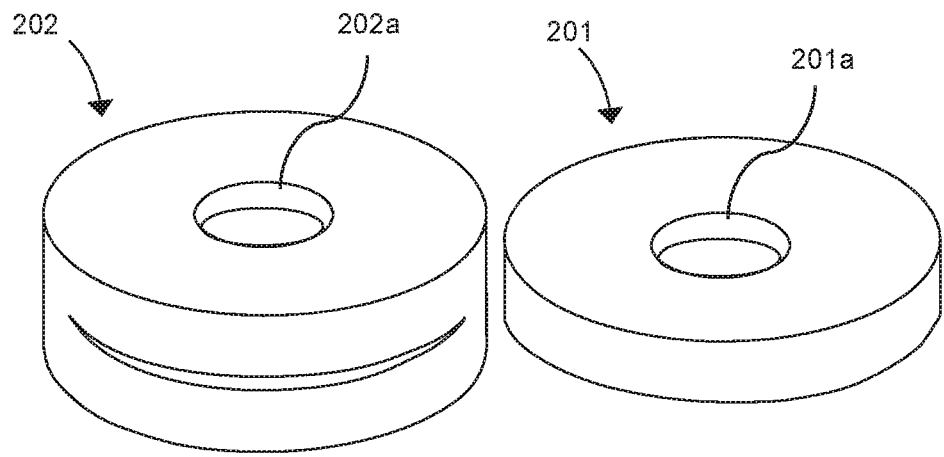
FIG. 2A shows shims that are used to test wear of shims during extrusion of mixtures of materials for forming honeycomb bodies.
Figure 2B:
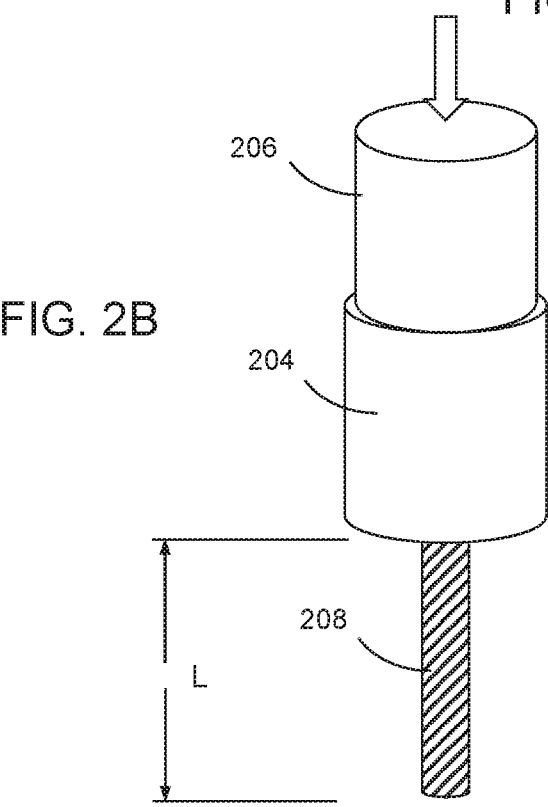
FIG. 2B shows a test setup used to test wear of dies during extrusion of mixtures of materials for forming honeycomb bodies.

FIG. 2A shows a double shim 202 having a hole 202a therethrough and single shim 201 having a hole 201a therethrough. The shims 201 and 202 are pieces of sheet metal with the hole cut through the pieces. FIG. 2B shows a test setup to test wear of the shims 201 and 202. A single shim 201 or a double shim 202 was placed into a barrel 204, and the mixture of cordierite-forming starting materials was pushed through the hole in each shim using a piston 206. Each shim hole 201a or 202a was measured before and after extrusion of a noodle 208 through each shim. The volume of material pushed through the shim was also measured, and the resultant noodle length L was calculated (assuming an average noodle diameter of the before and after hole diameter). The diameter increase of the hole in the shim (in mm) per length of noodle (in km) was used as a measure of abrasiveness in the mixture. The volume of material is calculated by measuring the volume of the barrel. The length of the noodle is calculated by assuming that the barrel volume equals the noodle volume, and then dividing the noodle volume by pi*$r^2$, where r is the average radius of the shim hole. After the length of the noodle is calculated then the ratio of the diameter change in the shim to the length of the noodle is calculated.

The binder used was in the hydroxypropyl methylcellulose (HPMC) family of binders.

TABLE 1

|  | Comp. Ex. 1 | Comp. Ex. 2 | Comp. Ex. 3 | Comp. Ex. 4 | Ex. 1 | Ex. 2 | Ex. 3 | Ex. 4 |
|---|---|---|---|---|---|---|---|---|
| Talc | 41.39 | 41.36 | 41.40 | 41.46 | 41.40 | 39.25 | 37.31 | 38.45 |
| Calcined Alumina | 20.65 | 20.29 | 20.72 | 21.27 | 20.72 | 9.82 |  | 12.15 |
| Boehmite, AlO(OH) | 16.00 | 16.25 | 15.75 | 15.12 | 15.75 | 14.93 | 14.19 |  |
| Alumina Trihydrate, Al(OH)3 |  |  |  |  |  | 15.03 | 28.57 | 29.00 |
| Coarse Silica | 21.96 | 22.10 | 22.12 | 22.15 |  | 20.97 | 19.93 | 20.40 |
| Fine Silica |  |  |  |  | 22.12 |  |  |  |
| Graphite | 20.00 | 20.00 | 20.00 | 20.00 | 20.00 | 19.0 | 18.0 | 20.0 |
| Starch | 20.00 | 20.00 | 20.00 | 20.00 | 20.00 | 20.0 | 20.0 | 20.0 |
| Binder | 4.50 | 4.50 | 4.50 | 4.50 | 4.50 | 4.5 | 4.5 | 4.5 |
| Fatty Acid | 0.86 | 0.86 | 0.86 | 0.86 | 0.86 | 0.87 | 0.88 | 0.86 |
| Water | 35.00 | 34 to 36 | 35.3 to 37.3 | 34.1 to 36.3 | 33.5 to 35.4 | 35.1 | 37.1 | 31.8 |
| Abrasion Rate, mm/km | 0.099 to 0.125 | 0.085 to 0.152 | 0.098 to 0.173 | 0.103 to 0.154 | 0.049 to 0.082 | 0.077 | 0.073 | 0.047 |

|  | Ex. 5 | Ex. 6 | Ex. 7 | Ex. 8 | Ex. 9 | Ex. 10 |
|---|---|---|---|---|---|---|
| Talc | 39.79 | 39.87 | 39.25 | 39.45 | 39.70 | 37.31 |
| Calcined Alumina | 15.70 | 16.57 | 9.82 | 12.71 | 14.83 |  |
| Boehmite, AlO(OH) | 8.25 | 7.25 | 14.93 | 11.67 | 9.09 | 14.19 |
| Alumina Trihydrate, Al(OH)3 | 15.00 | 15.00 | 15.03 | 15.10 | 15.16 | 28.57 |
| Coarse Silica |  |  |  |  |  |  |
| Fine Silica | 21.26 | 21.30 | 20.97 | 21.08 | 21.21 | 19.93 |
| Graphite | 15.0 | 15.00 | 19.0 | 16.0 | 15.0 | 18.0 |
| Starch | 20.0 | 20.00 | 20.0 | 20.0 | 20.0 | 20.0 |
| Binder | 4.5 | 4.50 | 4.5 | 4.5 | 4.5 | 4.5 |
| Fatty Acid | 0.87 | 0.87 | 0.87 | 0.88 | 0.87 | 0.88 |
| Water | 34.0 | 31.7 to 33 | 35.1 | 34.0 | 34.0 | 36.0 |
| Abrasion Rate, mm/km | 0.064 | 0.070 to 0.072 | 0.054 | 0.064 | 0.091 | 0.093 |

The results showed that the Examples using alumina trihydrate and fine silica exhibited lower wear on the shims. Therefore, by replacing the calcined alumina and the boehmite with aluminum trihydrate and using finer silica in place of coarser silica in the mixture resulted in lower wear of the die. Table 1 shows the batches, and the die weight change using production equipment. Die weight is defined as the weight of a piece of dried honeycomb body divided by the length. The measurement was monitored during extrusion to ensure that the die is changed when the weight becomes high. A high weight indicates that the die slots are wearing out, and the webs are becoming too thick to pass specification. During trials on the production equipment with the fine silica substitution for the coarse silica, the die weight increased 15% less on average compared with honeycomb bodies made with the coarse silica. This translates to about a 18% longer die coating footage, which is the amount of honeycomb body that can be extruded from a die (in length) before the die must be recoated. When both the silica and alumina replacements are used, the die weight increased 34% less, translating to a 50% longer die coating footage. When alumina trihydrate is used in the mixture, due to the density being lower than alumina, there is an additional benefit of higher native porosity (the porosity that exists without adding organic pore formers). Removing graphite from the mixture reduces cost.

During lab testing, die weights cannot be captured in a reasonable time frame, so a shim test was developed.

Figure 3:
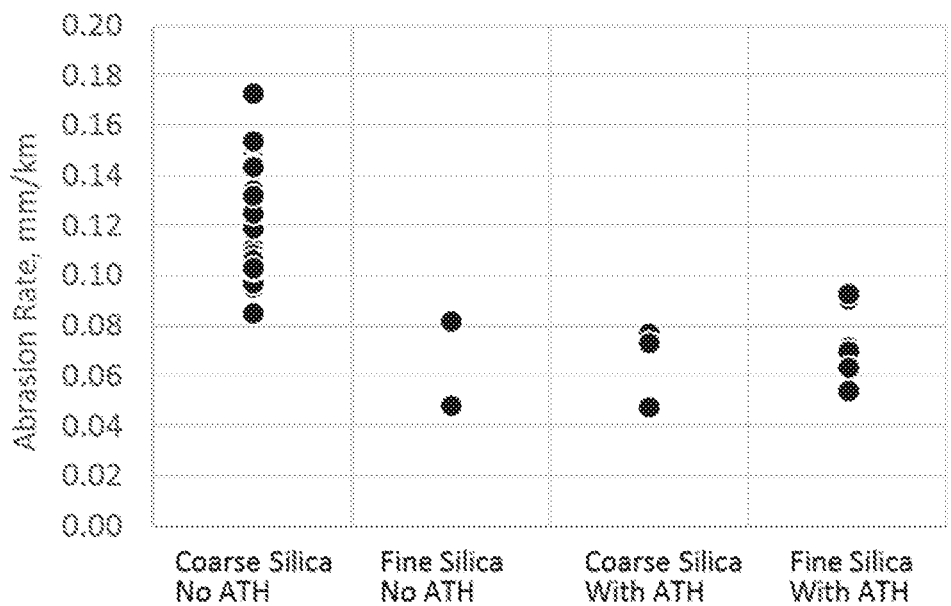
FIG. 3 is a graph showing shim wear for a single shim test.

FIG. 3 shows results for batches in Table above. FIG. 3 is a graph showing bottom shim wear for a single shim test. Abrasion rate as measured by wearing (or enlarging) of a hole in a shim (in mm diameter) per length of noodle (in km) passed through the shim.

Figure 4:
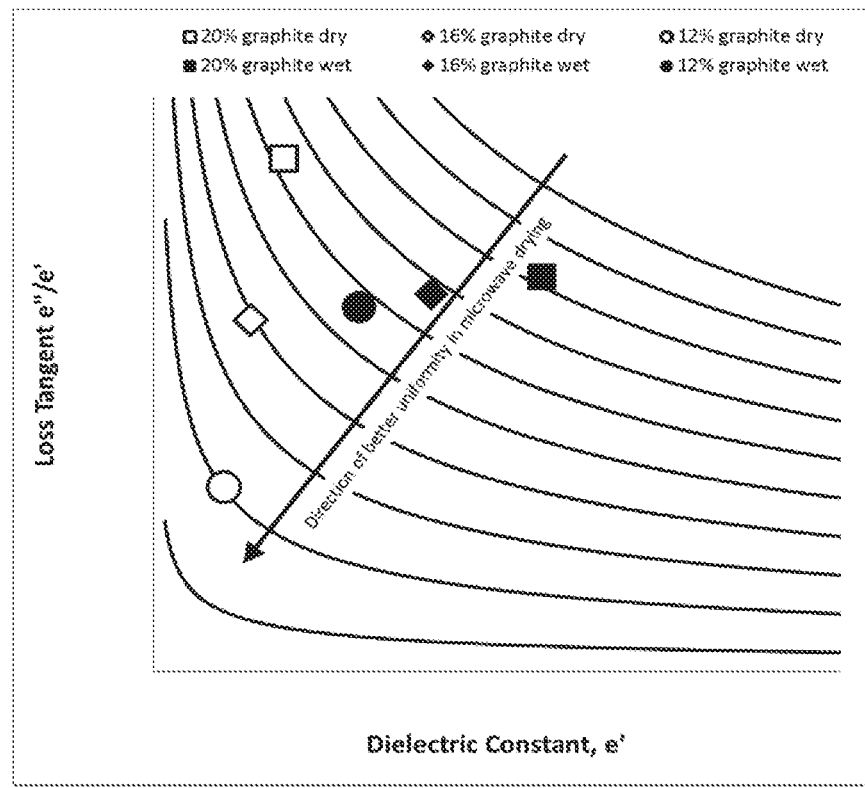
FIG. 4 a graph showing the effect of changing the amount of graphite in the batch on dielectric properties of wet and dry honeycomb material at 85% Open Frontal Area (OFA)

FIG. 4 is a graph showing the change in amount of graphite in the batch on dielectric properties of wet and dry honeycomb material at 85% Open Frontal Area (OFA). The measurement was made on solid rods of wet and dried material, and then the numbers were adjusted to reflect a cellular structure with 85% OFA. A cavity perturbation method was used. Lower dielectric constant and loss tangent indicate better drying uniformity, which is an added benefit to manufacturing due to enabling lower pore former use (lower graphite use). As shown in FIG. 4, the dielectric properties change significantly enough to impact the microwave drying process in a positive manner. First, the reduced amount of graphite in the mixture reduces the dielectric constant and the dielectric loss, both of which help the microwaves to better penetrate the extruded green body. FIG. 4 shows the dielectric properties of a series of materials that contain 20, 16 and 12% graphite.

Figure 5:
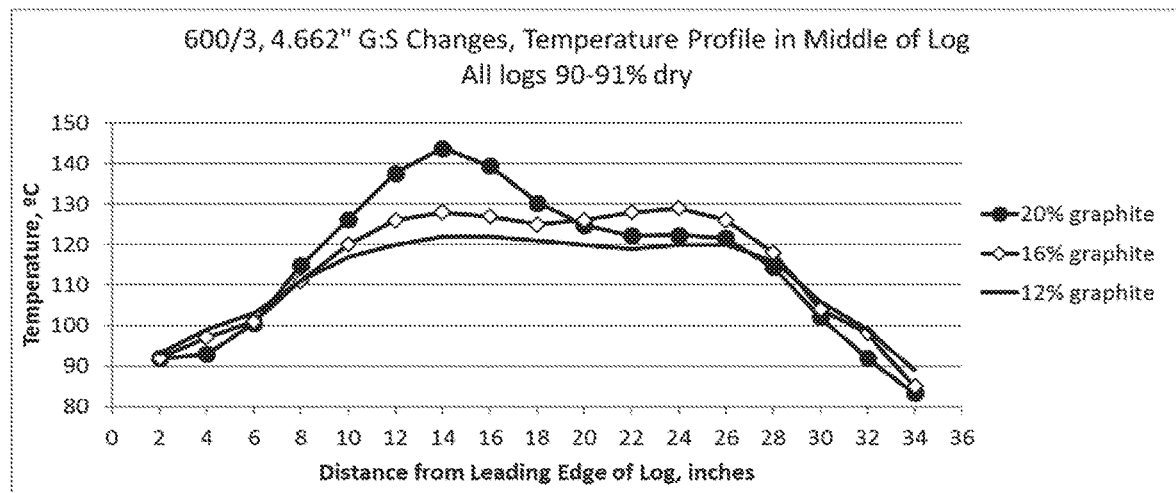
FIG. 5 is a graph showing temperature from one end of log samples to the other end when subjected to a microwave field for samples having different graphite contents.

FIG. 5 is a graph showing lab testing of ware [HONEYCOMB BODIES?] with 20%, 16% and 12% (by weight) graphite. Lower amounts of graphite exhibited more uniform temperatures. Thermocouple probes were poked into the log after drying to see the temperature in the middle of the log. FIG. 5 shows the temperature from one end of the log to the other when subjected to a microwave field. The ends of the logs have been shielded with caps to prevent them from overheating.

Figure 6:
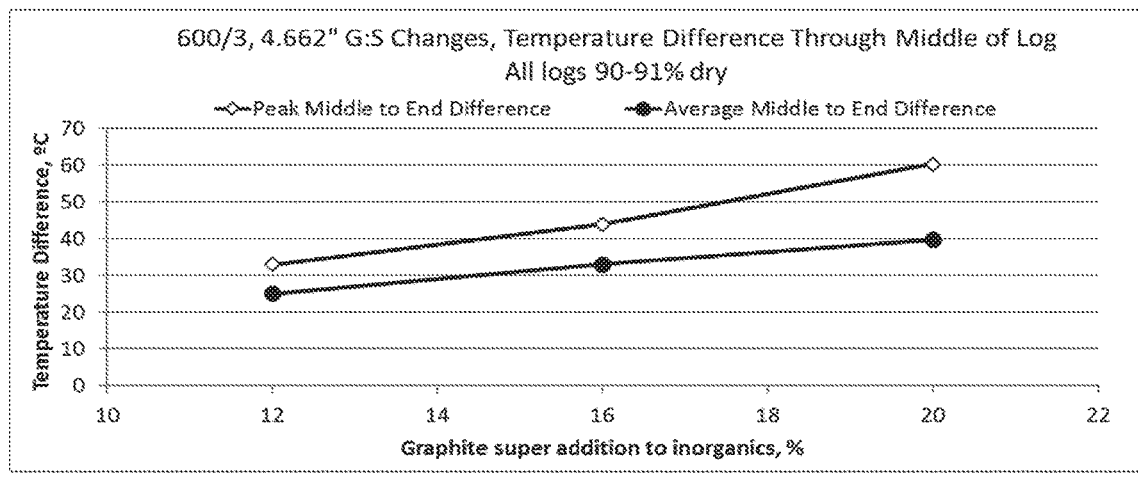
FIG. 6 is a graph showing temperature differences along the length of the log for samples having different graphite contents.

FIG. 6 is a graph showing temperature differences along the length of a log, is an extruded piece cut into smaller sections called logs. After drying, the logs are cut into pieces. As the graphite content is reduced, differences along the length of the log are reduced. FIG. 6 shows that the uniformity, as measured by the difference in the maximum and minimum temperature is lower for the materials with less graphite. The difference of the average middle of the log (from 12" to 26") minus the average end of the log (average of the 2-8" and 28-34") is also lower for materials with less graphite.

Thus, in various embodiments disclosed herein are improved batch mixtures of ceramic materials that can exhibit less wear on the extrusion dies and/or other parts of the extruder, which alternatively or in addition, are easier to process during drying and firing of the honeycomb bodies extruded from the batch mixtures.

Reference throughout this specification to "one embodiment," "certain embodiments," "various embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in various embodiments," "in one embodiment" or "in an embodiment" in various places throughout this specification are not necessarily referring to the same embodiment of the disclosure. Furthermore, the particular features, structures, materials, or characteristics may be combined in any suitable manner in one or more embodiments.

Although the disclosure herein provided a description with reference to particular embodiments, it is to be understood that these embodiments are merely illustrative of the principles and applications of the disclosure. It will be apparent to those skilled in the art that various modifications and variations can be made to the present disclosure without departing from the spirit and scope thereof. Thus, it is intended that the present disclosure include modifications and variations that are within the scope of the appended claims and their equivalents.

What is claimed is:

1. A method of manufacturing a ceramic honeycomb article comprising cordierite, the method comprising: extruding a cordierite-forming mixture through a die to form a green honeycomb article, the mixture comprising a liquid, a binder and a plurality of inorganic components comprising: an alumina source comprising alumina trihydrate (Al(OH)$_3$) in an amount of from 5 wt. % to about 35 wt. % with respect to the inorganic components, the alumina source further comprising boehmite (AlOOH), or calcined alumina, or a combinations of boehmite (AlOOH) and calcined alumina; and particulate silica having a D90 particle size less than 15 pm and greater than 0.5 pm in an amount of from 5 wt. % to about 30 wt. % with respect to the inorganic components, wherein the mixture is free of clay; wherein the inorganic components further comprise talc; and heating the green honeycomb article to expose the green honeycomb article to temperatures for times sufficient to form a honeycomb article having a cordierite phase.

2. The method of claim 1, wherein surfaces of the die in contact with the mixture are worn down by the extruding at a slower rate than for surfaces of a die in contact with a nearly identical mixture except that the nearly identical mixture does not contain alumina trihydrate but contains a different alumina source in place of alumina trihydrate.

3. The method of claim 1, wherein the mixture further comprises an amount of pore former material present in an amount of from 0% by weight and 15% by weight as a superaddition to a dry weight of the plurality of inorganic components, and, wherein upon firing, the ceramic article is provided with a porosity of at least 45% as measured by mercury porosimetry.

4. The method of claim 3, wherein, upon firing, the ceramic article comprises a porosity of at least about 55% as measured by mercury porisimetry.

5. The method of claim 4, wherein the pore former material comprises one or more of starches, starch-based materials, cellulose-based compounds, graphite, activated carbon, coke, synthetic polymers, and naturally occurring polymers.

6. The method of claim 5, whreein the pore former material consists essentially of graphite.

7. The method of claim 1, wherein the green honeycomb article exhibits a linear shrinkage of less than about 8% upon firing into the ceramic article at a temperature in a range of from about 1300° C. to about 1450° C. for a period of time of from about 1 to about 200 hours.

8. The method of claim 1, wherein the alumina trihydrate (Al(OH)$_3$) is present in an amount of from 5 wt % to about 25 wt % with respect to the inorganic components, and the particulate silica is present in an amount of from 10 wt % to about 30 wt %.

9. The method of claim 1, wherein the alumina trihydrate (Al(OH)$_3$) is present in an amount of from 5 wt % to about 20 wt % with respect to the inorganic components, and the particulate silica is present in an amount of from 12 wt % to about 25 wt %.

10. The method of claim 1, wherein the alumina trihydrate (Al(OH)$_3$) is present in an amount of from 8 wt % to about 18 wt % with respect to the inorganic components, and the particulate silica is present in an amount of from 12 wt % to about 25 wt %.

11. The method of claim 1, wherein the particulate silica has a median particle size in a range of from about 0.001 μm to about 10 μm.

* * * * *

UNITED STATES PATENT AND TRADEMARK OFFICE
CERTIFICATE OF CORRECTION

PATENT NO. : 11,505,503 B2
APPLICATION NO. : 16/849407
DATED : November 22, 2022
INVENTOR(S) : Marcia Kim Hansen et al.

It is certified that error appears in the above-identified patent and that said Letters Patent is hereby corrected as shown below:

In the Claims

In Column 11, Line 9 (Approx.), in Claim 6, delete "whreein" and insert -- wherein --.

Signed and Sealed this
First Day of August, 2023

Katherine Kelly Vidal
*Director of the United States Patent and Trademark Office*